March 14, 1944. W. T. PERKINS 2,344,263
PROJECTOR
Filed July 10, 1942 2 Sheets-Sheet 1

WILLARD T. PERKINS
INVENTOR
BY
ATTORNEYS

March 14, 1944. W. T. PERKINS 2,344,263
PROJECTOR
Filed July 10, 1942 2 Sheets-Sheet 2

WILLARD T. PERKINS
INVENTOR
BY
ATTORNEYS

Patented Mar. 14, 1944

2,344,263

UNITED STATES PATENT OFFICE 2,344,263

PROJECTOR

Willard T. Perkins, Irondequoit, N. Y., assignor to Bausch & Lomb Optical Company, Rochester, N. Y., a corporation of New York Application July 10, 1942, Serial No. 450,434

5 Claims. (Cl. 88—24)

The invention relates to projectors and more particularly has reference to apparatus for projecting transparent slides.

An important object of the invention is to provide a projector which is readily convertible to the projector of large or small sized slides. Another object is the provision of novel means for selectively positioning a supplementary lens in alignment with the condenser lens means used with a projector. Yet another object is to provide a linkage system of extreme simplicity for elevating and lowering a supplementary lens with respect to fixedly mounted lens means whereby to move the supplementary lens into and out of working position with respect to the fixed lens means. A further object of the invention resides in the provision of an improved construction and means for ventilating the interior of projecting apparatus.

These and other objects and advantages reside in certain novel features of construction, arrangement and combination of parts as will be hereinafter more fully set forth and claimed.

Referring to the drawings, wherein like reference characters designate similar parts in the different views.

Figure 1:
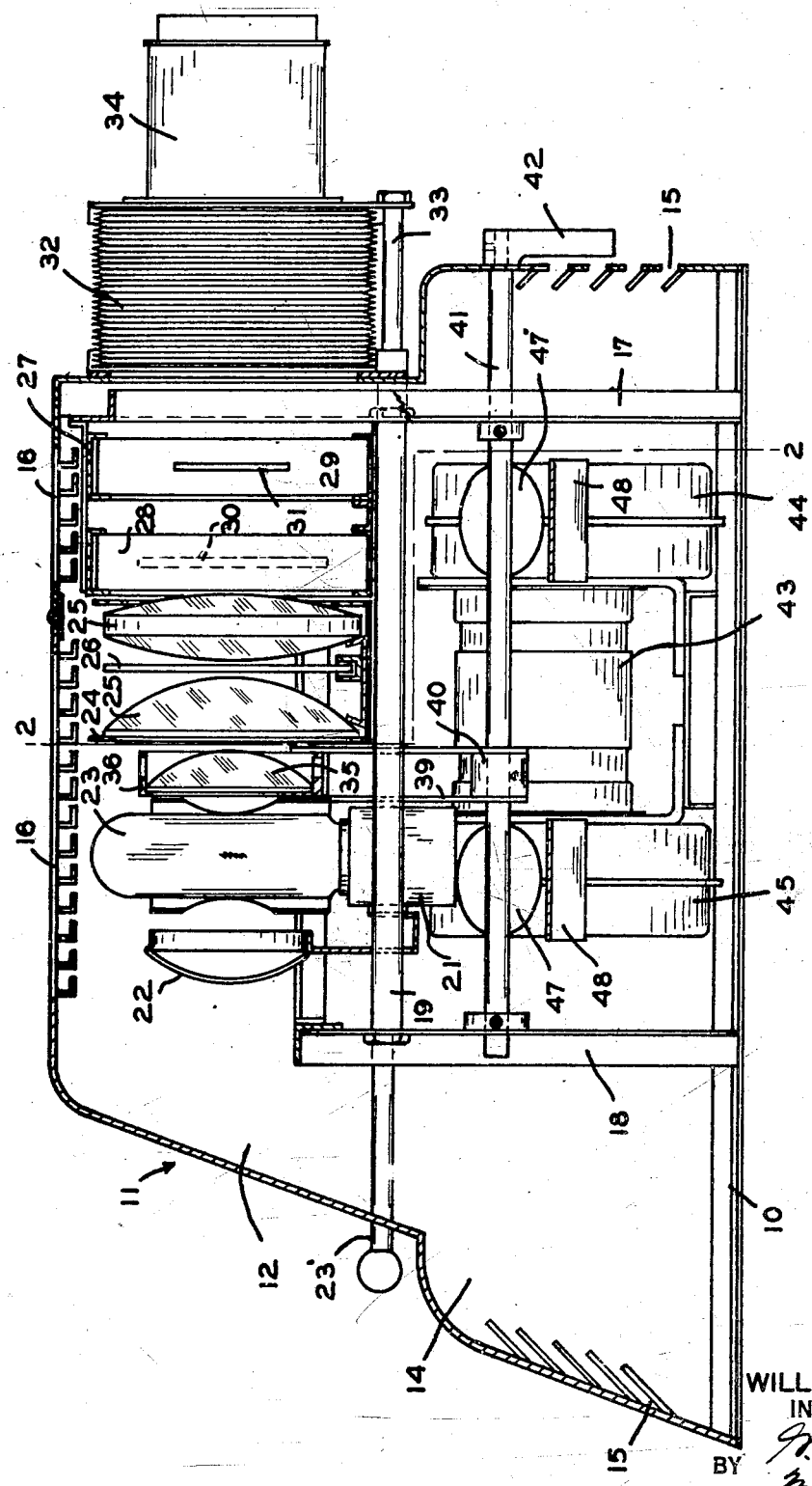
Figure 1 is a side elevation of one form of the invention with parts in section and with parts broken away.

One successful embodiment of the invention employs a base 10 which is surrounded by a housing 11 having an upper portion 12 and a lower portion 14. Openings 15 are formed in the opposite ends of the lower portion 14 of the housing and have deflectors adjacent thereto for directing the path of the air which is drawn into the lower portion of the housing by blower means mounted therein. The air drawn into the housing 11 is forced upwardly and out of the housing through openings 16 in the top of the housing.

Within the housing 11 and extending upwardly from the base 10 is a frame formed of pairs of end stanchions 17 and 18 which are tied together by tie rods 19 and 20. These tie rods are spaced apart in parallel relation to each other and have their longitudinal axes in a plane which is substantially parallel to the base 10 and which is located in the upper portion 14 of the housing 11.

An optical bench arrangement is provided by the rods 19 and 20 on which there is mounted a support member for an electric bulb socket 21 and a reflector 22 in back of the socket. Shown in the socket is a bulb 23. The reflector 22 and light source 23 are movable longitudinally of the housing 11 and are adjusted by conventional means actuated by rod 23' which extends through the back of the housing. A mount 24, which carries condensing lenses 25 with the usual transparent heat screen 26 between them, is suitably supported on rods 19 and 20 in front of the light source. Also supported on rods 19 and 20 is a slide carrier frame 27 which is located in front of the lenses 25.

The slide carrier frame 27 is adapted to have conventional slide carriers 28 and 29 slidably mounted therein. These carriers extend through the frame and are removable therefrom. Carrier 28 removably supports a relatively large slide 30 for alignment with the condensing lenses while carrier 29 is adapted to removably support a smaller slide 31. The dotted lines in Figure 1 for the slide 30 indicate that the slide carrier 28 is in a position wherein this slide is inoperative.

The front end of the upper portion of the housing 11 is provided with an opening which is in alignment with the condensing lenses. Secured around this opening on the outside of the housing is an adjustable bellows 32, the front board of which is carried on a pair of rods 33. Each rod 33 telescopes in a rod 19 or 20, these latter being of tubular construction. A suitable projection objective 34 is detachably secured to the front board of the bellows and is aligned with the condensing lenses 25. By this construction, the optical axis of the projection system is located in a plane which passes through the longitudinal axis of the housing 11 and which is substantially perpendicular to the base 10.

The condensing lenses 25 are suitable for illuminating a slide of the size of the large slide 30. However, the area thus illuminated will be greater than that of the smaller slide 31. Hence, from the standpoint of efficiency and satisfactory performance in the projection of the smaller slide, it is necessary to concentrate the light beam, normally transmitted by the condensing lenses 25, onto an area of a size similar to that of the smaller slide 31. Through the use of a supplementary condensing lens 35, which is adapted to be moved into and out of operative alignment with the lenses 25, the projector is made convertible for the projection of either large or small slides.

The effect of introducing the supplementary lens 35 into the condensing system is to change the effective focal length of the system and to reduce the area of the transmitted beam in the plane of the slide to be projected. As will be well understood by the art, projection objectives of suitably different focal lengths and other characteristics are employed with the condenser system used to project large slides and with the system used in the projection of small slides. The objective 34 is employed when the supplementary lens 35 is in operative position. while this objective is removed from its support and replaced by an objective suitable for use with large slides when the supplementary lens 35 is out of working position.

Figure 5:
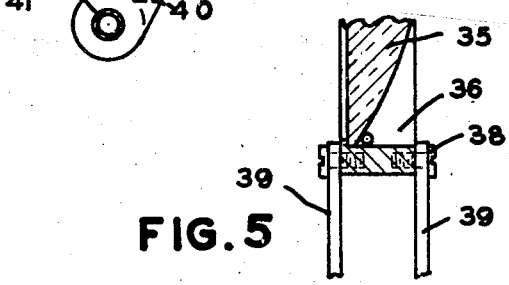
Figure 5 is a broken away side elevation with parts in section of the mounting for the supplementary lens.

The means for adjustably supporting the supplementary lens 35 makes use of a cylindrical mounting member 36 in which the lens is retained by any conventional means. A pair of links 37, one at each side of the mount 36, are each pivotally connected to the mount by a pivot screw 38 threaded into an end of the mount. Each of a second pair of links 39 are similarly pivoted to the lens mount 36 at opposite sides thereof. The construction just described permits the pivots for links 37 and 39 to be located at opposite ends of a chord of the lens 35, the pivot screws 38 in each set of links being aligned with each other as shown in Figure 5.

In supporting the supplementary lens 35, the end of each link 37 away from the lens mount 36, is provided with a suitable bore which allows it to be pivotally engaged on the rod 20. Conventional means, not shown, may be employed if desired to restrain movement of the links 37 longitudinally of the rod 20. The end of each link 39 most distant from the lens mount 36 is secured to a spacing collar 40 fixed on a rotatable shaft 41 which extends longitudinally of the housing 11.

Shaft 41 is rotatably supported, in suitable manner, on aligned end stanchions 17 and 18 at a position which is substantially directly below the tie rod 19. Connection of the links 39 to shaft 41 is permitted by making these links of a greater length than the links 38. Due to the construction employed, the longitudinal axis of the shaft 41 is not only parallel to the tie rods 19 and 20 but is also parallel to the optical axis of the projection system, the latter axis being located above the tie rods to extend in lengthwise direction of these rods and midway between them. One end of the shaft 41 extends through the front end of the housing 11 and is provided with an operating handle 42 to facilitate the rotation of the shaft.

Figure 2:
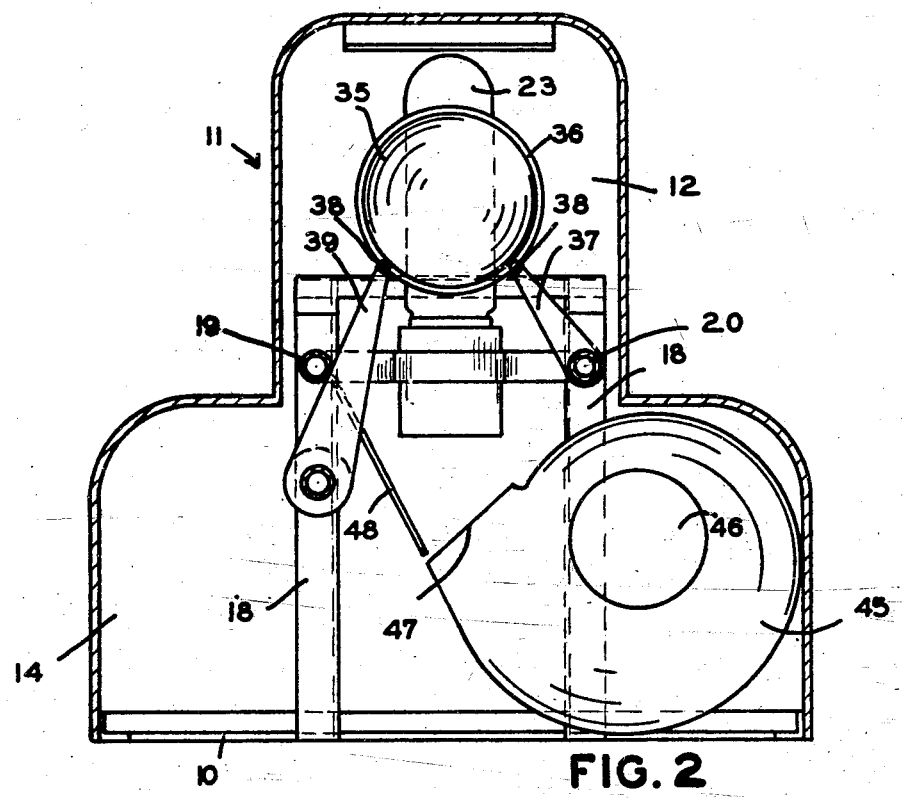
Figure 2 is a sectional elevation on the line 2—2 of Figure 1.
Figure 3:
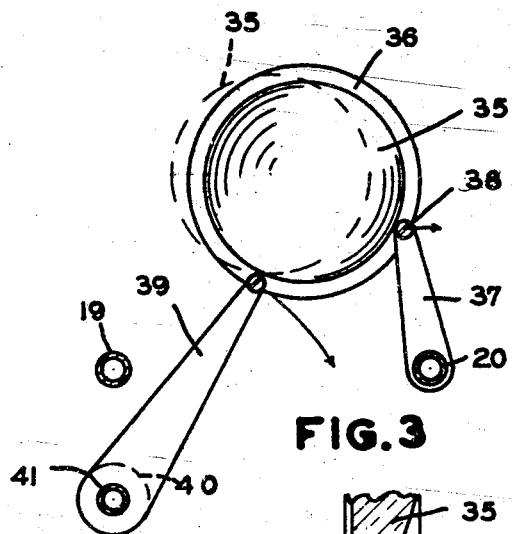
Figures 3 and 4 are partial views, both similar to Figure 2, and detail the movement of a supplementary lens of the projection apparatus during the course of the adjustment of the lens from an operative to an inoperative position.

The link means just described are so designed that the supplementary lens 35 is held in alignment with the condensing lenses 25 when links 37 and 39 are in the position shown in Figures 1 and 2. To move the supplementary lens 35 to an inoperative position, shaft 41 is rotated clockwise as viewed in Figures 2 and 3. This causes lens 35 to be bodily moved from the dotted line position of Figure 3 first towards the right, the pivots 38 moving in the direction of the arrows.

Figure 4:
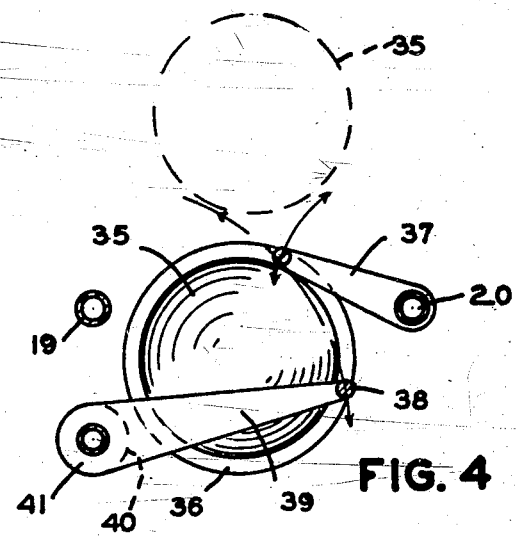

On continued clockwise rotation of the shaft 41, lens 35 begins to lower itself towards the base 10 and also to move slightly to the left until it assumes the inoperative position shown in the full lines of Figure 4. As illustrated in Figure 4, when the lens is in inoperative position, each of the pair of links 37 and also each of the links 39 overlap a lens surface with the lens nested between them. Also, when lens 35 is in inoperative position, it may be noted that it is in clearance with respect to the condensing lenses. The arrow lines in Figure 4 indicate the paths of movement of the pivots 38.

To complete preparation of the projector for the projection of large size slides 30, the objective 34 is replaced by an objective suitable for projecting slides of this size and the slide carrier 27 for the small sized slides is removed. Reconversion of the projector for use with miniature slides requires, in addition to changing the objective and slide carrier, that the supplementary lens 35 be raised into its operating position. The latter is accomplished by rotating shaft 41 in a counterclockwise direction, movement of the lens 35 then being reversed along the path already described.

The adjustable mounting for the lens 35 permits it to be moved upwardly and downwardly with respect to the optical axis of the projector while restraining the movement of the geometrical center of both surfaces of the lens within a plane which is substantially perpendicular to the optical axis. Movement of the center of a lens surface, during movement of the lens 35 from operative to inoperative position, traces a path which simulates the shape of an interrogation mark. During its movement, the lens 35 passes between tie rods 19, 20 which determine the width of the space within which the lens is confined. This width is bounded by a plane which passes through the longitudinal axis of tie rod 19 and also one which passes through the longitudinal axis of rod 20, both of these planes being substantially perpendicular to the base 10.

It may be noted that the lower portion 14 of the housing 11 is wider than the upper portion 12 so that the transverse cross section of the housing has the appearance of an inverted T. Suitable ventilating means for cooling the projector are mounted in one of the side arms or extensions of the lower portion 14 of the housing. These means comprise an electric motor 43 mounted on the base 10 in a central position with respect to the ends of the housing 11. Centrifugal blowers 44 and 45 which are carried by the motor mount, one on each end of the motor 43, are operatively connected to the drive shaft of the motor.

Each of the blowers 44 and 45 has its intake 46 located opposite the vents 15 in the end of the housing to which it is adjacent while the exhaust 47 of each blower is located below the longitudinal axis of the projector and points towards the top of the housing 11 to direct air upwardly through the housing. Suitable openings through the support portions of the lens mounts 36 and 26 and through the slide carrier frame 27 permit the discharge of air through these members and around the parts which they carry. Air discharged from the blowers escapes from the housing through the openings 16 at the top of the housing.

The exhaust of blower 45 is preferably located under the light source 23 to direct the major portion of its discharge around the same while that of blower 44 is similarly located under the slide carriers 28 and 29 to send the greater portion of its discharge adjacent the members located directly above it. A deflector 48 may be supported on rod 19 opposite each exhaust to extend downwardly towards the latter. These means assure that the greatest possible volume of air discharged by the blowers will be directed through the heated upper portion of the housing by tending to prevent dissipation of the cooling currents in the lower portion of the projector.

An important feature of the device described resides in the elimination of circuitous air ducts leading from a blower exhaust to the part of the projector to be cooled. This is made possible by the ability of the design to permit air to be drawn into the housing from each end thereof and also by the placing of the blowers so that their exhausts are under the working parts of the projector in suitable alignment with these parts to discharge cool air directly over them and out of the top of the projector.

From the foregoing, it will be realized that the objects of the invention have been reached by the provision of simple structure for converting a projector for use with different sized slides. At the same time, there has been incorporated in the projector, a design which permits the projector to be efficiently cooled.

I claim:

1. In a projector having a frame provided with a pair of spaced parallel rods the longitudinal axes of which lie in substantially the same plane and condenser lens means carried by and supported above said rods in a position wherein the optical axis of the lens means is substantially parallel to the longitudinal axes of said rods, the combination of a supplementary condenser lens, a mount on one of said rods for said supplementary lens, and means operatively connected to said mount for selectively positioning said supplementary lens in alignment with said condenser lens means and said optical axis and in an inoperative position with respect to said lens means, said positioning means comprising an actuating shaft rotatably carried by said frame below said rods in substantially parallel relation to the rods, link means pivoted on one of said rods and pivotally connected to said mount, other link means pivotally connected to said mount and fixed to said operating shaft to cause the supplementary lens to be moved between said rods towards and away from said optical axis in accordance with the rotation of said actuating shaft.

2. In a projector having a frame provided with a pair of substantially parallel rods extending lengthwise thereof with the longitudinal axes of the rods lying substantially in the same plane and a condenser lens system carried by and supported above the rods, the combination of a supplementary condenser lens adapted to be moved into and out of alignment with said lens system, a mount supported on one of said rods in which said lens is carried, a rotatable shaft supported by and extending lengthwise of the frame below and in substantially parallel relation to said rods, and support means for said supplementary lens on one of said rods and actuated on the rotation of said shaft and means connected to said shaft and to one of said rods and to said lens mount for moving the supplementary lens into and out of operative position between said rods and within said frame in a manner wherein the geometrical center of either surface of said supplementary lens is restrained in a plane which is substantially perpendicular to the optical axis of said condenser lens system.

3. In projection apparatus of the type convertible to project slides of different sizes and having a base, a supporting frame extending above said base, a condensing lens system, and means for supporting said condenser lens system on said frame with its optical axis lying substantially in a plane which passes through the longitudinal axis of said frame and which is substantially perpendicular to said base, the combination of means for varying the focal length of said condensing lens system comprising a supplementary lens adapted to be moved into and out of alignment with said condensing lens system, means for supporting said supplementary lens on said frame, comprising link means between which said supplementary lens is supported, said link means being pivotally connected to said lens at opposite ends of a chord of the lens, the link means at one end of said chord having its opposite end pivoted for rotation about an axis which is located adjacent one side of said frame in substantially parallel relation to but below the optical axis of said condensing lens system, a shaft rotatably carried by said frame below and in parallel relation to the optical axis of said condensing lens system adjacent the side of said frame which is opposite said first-mentioned side, the second link means at the other end of said chord having its end opposite said chord fixed to said shaft and crank means on said shaft for effecting its rotation and the movement of said supplementary lens into and out of operative position.

4. In projection apparatus of the type convertible to project slides of different sizes, comprising a supporting frame carrying a condensing lens system, the combination of a supplementary condensing lens, a shaft rotatably mounted on said frame, an actuating link having one end fixed to said shaft and the opposite end pivotally connected to one side of said supplementary lens, a follower link pivotally interconnecting the opposite side of said supplementary lens and the frame, and means for rotating said shaft to cause the actuating link to move the supplementary lens into alignment with said condensing lens system and out of alignment with said system in accordance with the rotation of said shaft, the follower link following said supplementary lens and restraining pivotal movement of said lens relative to said actuating link.

5. A projector comprising a housing having an upper portion and a lower portion, the upper housing portion having a reflector, a light source, condensing lens means and means supported therein for carrying a transparent slide to be projected, the opposite end walls of the lower portion of the housing and the top wall of the upper housing portion being provided with ventilated openings, a blower mounted in the lower portion of the housing adjacent each end wall thereof with the intake thereof facing the ventilated openings in the wall, one of said blowers being so located in the lower housing portion that air drawn into the same is directly discharged around said light source and then passed upwardly through the ventilating opening in the top wall of the housing, the other of said blowers being located below said means for supporting a transparent slide and discharging air upwardly around the latter and then through the ventilating openings of the top wall of the upper housing portion, and means in the lower portion of the housing and connected to both blowers for actuating the same.

WILLARD T. PERKINS.